United States Patent
Jacobs et al.

(10) Patent No.: US 9,697,346 B2
(45) Date of Patent: Jul. 4, 2017

(54) METHOD AND APPARATUS FOR IDENTIFYING AND ASSOCIATING DEVICES USING VISUAL RECOGNITION

(75) Inventors: Philip C. Jacobs, Windham, NH (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 13/412,948

(22) Filed: Mar. 6, 2012

(65) Prior Publication Data

US 2013/0239205 A1  Sep. 12, 2013

(51) Int. Cl.
| | |
|---|---|
| *H04L 9/32* | (2006.01) |
| *G06F 21/36* | (2013.01) |
| *G06F 21/31* | (2013.01) |
| *H04L 29/06* | (2006.01) |
| *G06F 21/32* | (2013.01) |

(52) U.S. Cl.
CPC .............. *G06F 21/36* (2013.01); *G06F 21/31* (2013.01); *G06F 21/32* (2013.01); *H04L 63/08* (2013.01)

(58) Field of Classification Search
CPC .......... G06F 21/31; G06F 21/32; G06F 21/36; H04L 63/08
See application file for complete search history.

(56) References Cited

U.S. PATENT DOCUMENTS

| | | | | |
|---|---|---|---|---|
| 7,069,001 B2* | 6/2006 | Rupp et al. | .................... | 455/411 |
| 7,239,346 B1* | 7/2007 | Priddy | ............... | G06K 9/00885 |
| | | | | 348/220.1 |
| 7,245,314 B2* | 7/2007 | Ono | .............................. | 347/252 |
| 7,840,206 B2* | 11/2010 | Kaechi | .......................... | 455/411 |
| 7,865,395 B2* | 1/2011 | Klug et al. | ................... | 705/14.4 |

(Continued)

FOREIGN PATENT DOCUMENTS

| | | | | |
|---|---|---|---|---|
| JP | 2004178187 A | * | 6/2004 | ............. G06F 15/00 |
| JP | 2006221282 A | * | 8/2006 | |

(Continued)

OTHER PUBLICATIONS

Takada, "Awase-E: Image-based Authentication for Mobile Phones using Users Favorite Images", Human-Computer Interaction with Mobile Devices and Services, Springer Berlin/ Heidelberg, 2795: pp. 347-351.*

(Continued)

*Primary Examiner* — Luu Pham
*Assistant Examiner* — Walter Malinowski
(74) *Attorney, Agent, or Firm* — P. Su

(57) ABSTRACT

In one embodiment, a method includes identifying a request for access to a first system and obtaining a visual image including at least a first piece of information associated with the request. The visual image is associated with a first device and obtained using a second device. The method also includes determining if the at least first piece of information indicates that the access to the first system is to be granted, wherein determining if the at least first piece of information indicates that the access to the first system is to be granted includes implementing a visual recognition algorithm to process the at least first piece of information. Finally, the access to the first system is granted if it is determined that the at least first piece of information indicates that the access to the first system is to be granted.

16 Claims, 7 Drawing Sheets

(56) References Cited

U.S. PATENT DOCUMENTS

| | | | |
|---|---|---|---|
| 7,982,583 B1* | 7/2011 | Zhou et al. | 340/5.2 |
| 8,370,926 B1* | 2/2013 | Satish | 726/19 |
| 9,143,936 B2* | 9/2015 | Kim | H04W 12/06 |
| 2002/0141586 A1* | 10/2002 | Margalit et al. | 380/270 |
| 2003/0204357 A1* | 10/2003 | Hamilton | 702/128 |
| 2004/0076297 A1* | 4/2004 | Goeke | 380/211 |
| 2005/0052276 A1* | 3/2005 | Kumazaki et al. | 340/5.61 |
| 2005/0060554 A1* | 3/2005 | O'Donoghue | 713/183 |
| 2005/0154671 A1* | 7/2005 | Doan et al. | 705/39 |
| 2005/0249381 A1* | 11/2005 | Silvester et al. | 382/115 |
| 2006/0111143 A1* | 5/2006 | Pande et al. | 455/556.1 |
| 2006/0120604 A1* | 6/2006 | Kim et al. | 382/181 |
| 2006/0156385 A1* | 7/2006 | Chiviendacz et al. | 726/2 |
| 2006/0205496 A1* | 9/2006 | Fujimoto | 463/29 |
| 2007/0143825 A1* | 6/2007 | Goffin | 726/2 |
| 2007/0160264 A1* | 7/2007 | Kasahara et al. | 382/115 |
| 2007/0256118 A1* | 11/2007 | Nomura et al. | 726/3 |
| 2007/0269107 A1* | 11/2007 | Iwai et al. | 382/168 |
| 2007/0277219 A1* | 11/2007 | Toebes et al. | 725/139 |
| 2007/0277244 A1* | 11/2007 | de Beasley | 726/26 |
| 2008/0049985 A1* | 2/2008 | Wang et al. | 382/118 |
| 2008/0141351 A1* | 6/2008 | Park | 726/5 |
| 2008/0271122 A1* | 10/2008 | Nolan et al. | 726/4 |
| 2008/0303909 A1* | 12/2008 | Watanabe et al. | 348/211.2 |
| 2009/0077653 A1* | 3/2009 | Osborn et al. | 726/17 |
| 2009/0176505 A1* | 7/2009 | Van Deventer | G06F 1/1626 455/456.1 |
| 2009/0257595 A1* | 10/2009 | de Cesare et al. | 380/277 |
| 2009/0300744 A1* | 12/2009 | Guo et al. | 726/7 |
| 2010/0103242 A1* | 4/2010 | Linaker | 348/14.02 |
| 2010/0209006 A1* | 8/2010 | Grigsby et al. | 382/218 |
| 2010/0239131 A1* | 9/2010 | Murakami | 382/118 |
| 2011/0061100 A1* | 3/2011 | Mattila | G06F 3/017 726/17 |
| 2011/0081860 A1* | 4/2011 | Brown | H04N 1/00347 455/41.3 |
| 2011/0173703 A1* | 7/2011 | Kim et al. | 726/26 |
| 2011/0202466 A1* | 8/2011 | Carter | 705/67 |
| 2011/0202982 A1* | 8/2011 | Alexander et al. | 726/7 |
| 2012/0011575 A1* | 1/2012 | Cheswick et al. | 726/5 |
| 2012/0068812 A1* | 3/2012 | Yamamoto et al. | 340/5.1 |
| 2012/0110341 A1* | 5/2012 | Beigi | 713/186 |
| 2012/0198531 A1* | 8/2012 | Ort | H04W 12/08 726/7 |
| 2012/0198570 A1* | 8/2012 | Joa et al. | 726/30 |
| 2012/0242510 A1* | 9/2012 | Choi et al. | 340/988 |
| 2012/0292388 A1* | 11/2012 | Hernandez | 235/379 |
| 2013/0111352 A1* | 5/2013 | Tuukkanen | 715/744 |
| 2013/0143620 A1* | 6/2013 | Seo | 455/556.1 |
| 2013/0237155 A1* | 9/2013 | Kim | H04W 12/06 455/41.2 |

FOREIGN PATENT DOCUMENTS

| | | | |
|---|---|---|---|
| JP | 2011043902 A | * | 3/2011 |
| KR | 20080085353 | * | 9/2008 |

OTHER PUBLICATIONS

Carta, "Exploiting JPEG2000 and JPIP for Image Based Authentication", 2006 IEEE International Conference on Image Processing, ICIP 2006, Oct. 8-11, 2006, pp. 3109-3112.*

Komanduri, "Order and Entropy in Picture Passwords", Graphics Interface Conference 2008, May 28-30, 2008, Windsor Ontario Canada, pp. 115-122.*

Munich, "Camera-Based ID Verification by Signature Tracking", ECCV '98 Proceedings of the 5th European Conference on Computer Vision, vol. I, 1998, pp. 782-796.*

Shah, "Secure User Authentication in Multimedia Systems", IEEE, 2010, 4 pages.*

Peng, "Point&Connect: Intention-based Device Pairing for Mobile Phone Users", MobiSys'09, Jun. 22-25, 2009, Krakow, Poland, pp. 137-149.*

* cited by examiner

METHOD AND APPARATUS FOR IDENTIFYING AND ASSOCIATING DEVICES USING VISUAL RECOGNITION

The disclosure relates generally to the communications between nodes of a network. More particularly, this disclosure relates to using visual recognition to identify contents displayed on a screen of a device and, upon identification of the contents, to providing access to a resource or a service based on the identification to the device and/or a user of the device.

BACKGROUND

Registering devices such as computers and mobile telephones with a service or a resource generally involves a user having to manually input information pertaining to the devices into an interface associated with the service or the resource. Typically, existing registration methods require a significant degree of technical expertise. For example, to register a computer with a service, a user typically inputs a device identifier such as a MAC address of the computer into an interface associated with the service. Thus, the user must at least be able to locate the MAC address of the computer. Technical knowledge is also generally needed by a user to register a computer with a router, as the user may need to invoke and complete a wireless proximity registration process in order to register the computer with the router. Without an understanding of what information is needed in order to register a device with a service or a resource, a user may find it difficult and time-consuming to complete a registration process.

Some registration methods that allow devices to be registered with a service or a resource include the use of physical tokens. Physical tokens which may be provided with networkable devices may use technologies such as RFID which are readable by the router which the token is "dropped into." The networkable device information on the token may therefore be transferred to the router Physical tokens may be placed into cavities to register devices, and a registration process that utilizes physical tokens generally does not require a significant degree of technical expertise. However, physical tokens may be readily misplaced and, as such, the use of physical tokens may be impractical.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
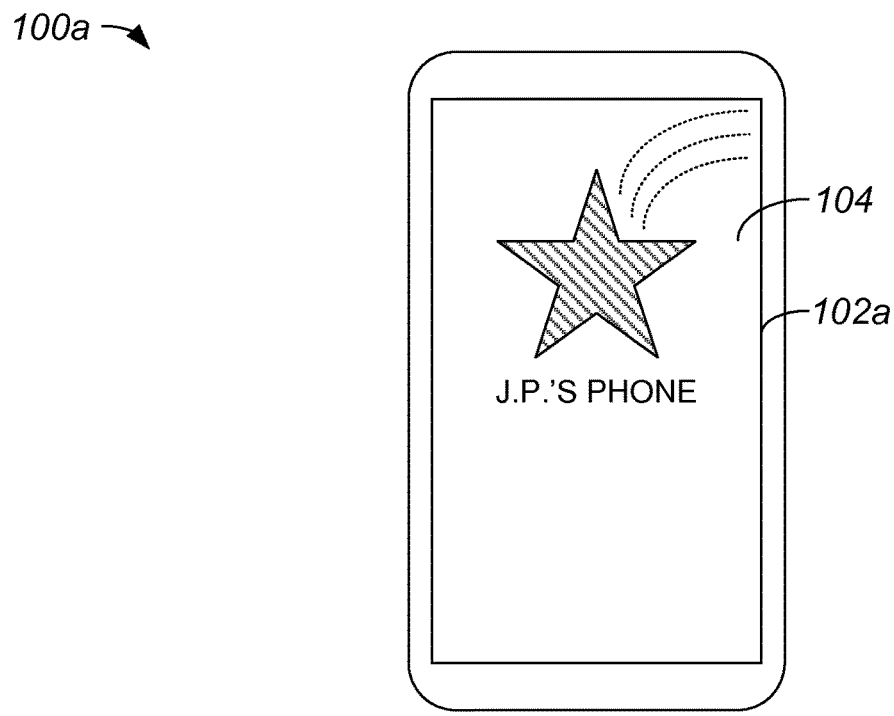
FIG. 1A is a diagrammatic representation of a device on which a passive screen that may be used for visual authentication is displayed in accordance with an embodiment.

According to one aspect, a method includes identifying a request for access to a first system and obtaining a visual image including at least a first piece of information associated with the request. The visual image is associated with a first device and obtained using a second device. The method also includes determining if the at least first piece of information indicates that the access to the first system is to be granted, wherein determining if the at least first piece of information indicates that the access to the first system is to be granted includes implementing a visual recognition algorithm to process the at least first piece of information. Finally, the access to the first system is granted if it is determined that the at least first piece of information indicates that the access to the first system is to be granted.

DESCRIPTION

Processes by which a user may register a device, e.g., a computer or a mobile phone, with a system that provides services and/or resources generally require a significant degree of technical knowledge on the part of the user. For example, the user may need to be aware of a MAC address of the device. Reducing the amount of technical knowledge needed by a user in order to register a device with a system may increase the efficiency with which the user may register the device with the system.

In one embodiment, a registration process involves presenting a device that has a display screen, e.g., a mobile phone or a computing device, to a visual recognition system. The display screen may display a visual message indication that allows the device and/or a user of the device to be identified through visual recognition, e.g., when the visual message indication is identified using visual recognition and substantially recognized as being associated with the device and/or the user. As a result, the device and/or the user of the device may be granted access to a resource and/or effectively registered for a service substantially upon the visual message indication being identified by the visual recognition system.

Once a device is visually recognized, e.g., through a visual message indication, data associated with the device may be acquired, e.g., from a data store or a repository in which identifying information of the device is stored. It should be appreciated that a user may provide data associated with a device to a data store which may then be accessed by different systems, e.g., application servers, once those systems visually identify the device. Using the data obtained from the data store, a system may then substantially automatically register the device with respect to the system.

When a content displayed on a device is known by a system to be associated with that device and/or with a particular user, once the content is identified, the device and/or the particular user may effectively be identified. By way of example, if a particular background screen is known to be associated with a mobile phone device belonging to a first person, upon identifying the particular background screen as being displayed on a device, the device may essentially be identified as the mobile phone device belonging to the first person. In one embodiment, once the mobile phone device is identified through visual recognition as belonging to the first person, the mobile phone device may be processed substantially automatically as belonging to the first person. In other words, visual recognition of contents displayed on a screen of a device may serve to efficiently identify the device.

Visual recognition may also be used to associate device information to a particular user. In other words, visual recognition may be used effectively to map a device with a particular user. For example, a visual recognition system may detect a person holding a particular device, and may utilize suitable facial recognition algorithms to effectively associate the particular device with the person. Thus, information relating to the particular device may be associated with the person. In one embodiment, once a person is recognized by a visual recognition system, an image of the display screen of a device in possession of the person may be obtained and the content displayed on the display screen may be associated with the person. Associating the content with the person enables the device to be identified as being substantially owned by the person when the content is visually recognized. By associating a device and a person, if there is a match of either the device or the person, then information associated with the identified matched may be used augment the other. For example, if there is a match to a person, information associated with the person may be used to effectively augment the device. Updating of information including the image of one associated element may occur if the other associated element is matched, e.g., an updated facial image or phone image may be essentially created. The match of an image may be used, in one embodiment, to enable an individual to log into a system.

Figure 1B:
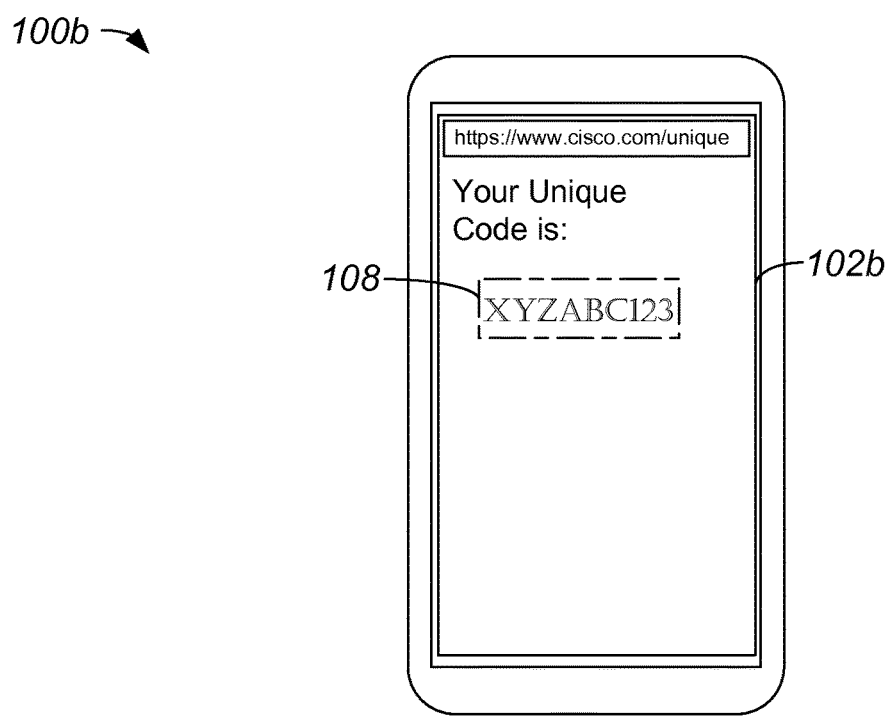
FIG. 1B is a diagrammatic representation of a device on which a first active screen that may be used for visual authentication is displayed in accordance with an embodiment.
Figure 1C:
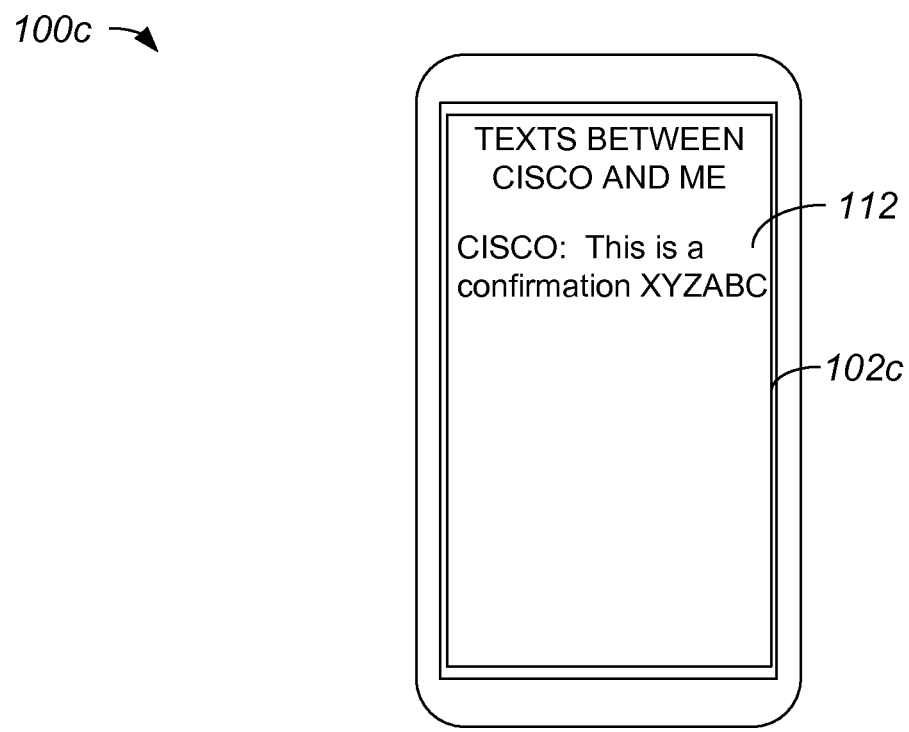
FIG. 1C is a diagrammatic representation of a device on which a second active screen that may be used for visual authentication is displayed in accordance with an embodiment.

Referring initially to FIGS. 1A-C, screens with content that may be used by a visual recognition algorithm to identify devices and/or a users of the devices on which the contents are displayed will be described in accordance with particular embodiments. FIG. 1A is a diagrammatic representation of a device on which a passive screen may be used to identify the device using a visual recognition algorithm in accordance with an embodiment. A device 100a includes a display screen 102a on which passive content 104 is displayed. As shown, passive content 104 may be a background such as a background associated with a home screen of device 100a. Passive content 104 may be used to uniquely identify device 102a, and is generally personalized by a user of device 102a. In other words, content 104 displayed on display screen 102a may effectively be mapped to, or otherwise associated with, device 100a. As such, when content 104 is visually recognized, device 100a is effectively identified.

FIG. 1B is a diagrammatic representation of a device on which a first active screen that may be used for visual authentication is displayed in accordance with an embodiment. A device 100b includes a display screen 102b on which, as shown, a browser window is displayed. Unique content 108 is displayed on display screen 102b, and is visually recognizable as being uniquely associated with device 100b. In one embodiment, unique content 108 may be provided to device 100b when device 100b is used to request access to a system (not shown). Unique content 108 is generally arranged to be visually recognizable and may be, but is not limited to being, a code formed from a character string or an icon.

In one embodiment, unique content 108 may be unauthenticated. Unique code 108 may be displayed as a result of a user of device 100b navigating to a web page on which unique code 108 is located, as shown. Alternatively, unique code 108 may be a code that is local to device 100b and unique to device 100b.

FIG. 1C is a diagrammatic representation of a device on which a second active screen that may be used for visual authentication is displayed in accordance with an embodiment. A device 100c includes a display screen 102c on which a messaging, e.g., texting, window is displayed. Unique content 112 is displayed on display screen 102c, and is visually recognizable as being uniquely associated with device 100c at approximately the time unique content 112 is obtained and displayed. In one embodiment, unique content 112 may be provided to device 100c in a text message, e.g., a character string, when device 100c is used to request access to a system (not shown).

When unique content 112 is provided by a system (not shown) to device 100c in response to a request to register with respect to the system, unique content 112 is effectively authenticated. Unique content 112, as shown, is sent by the system (not shown) and may be substantially confirmed as being received when the system is made aware that unique content 112 is displayed on display screen 102.

Figure 2:
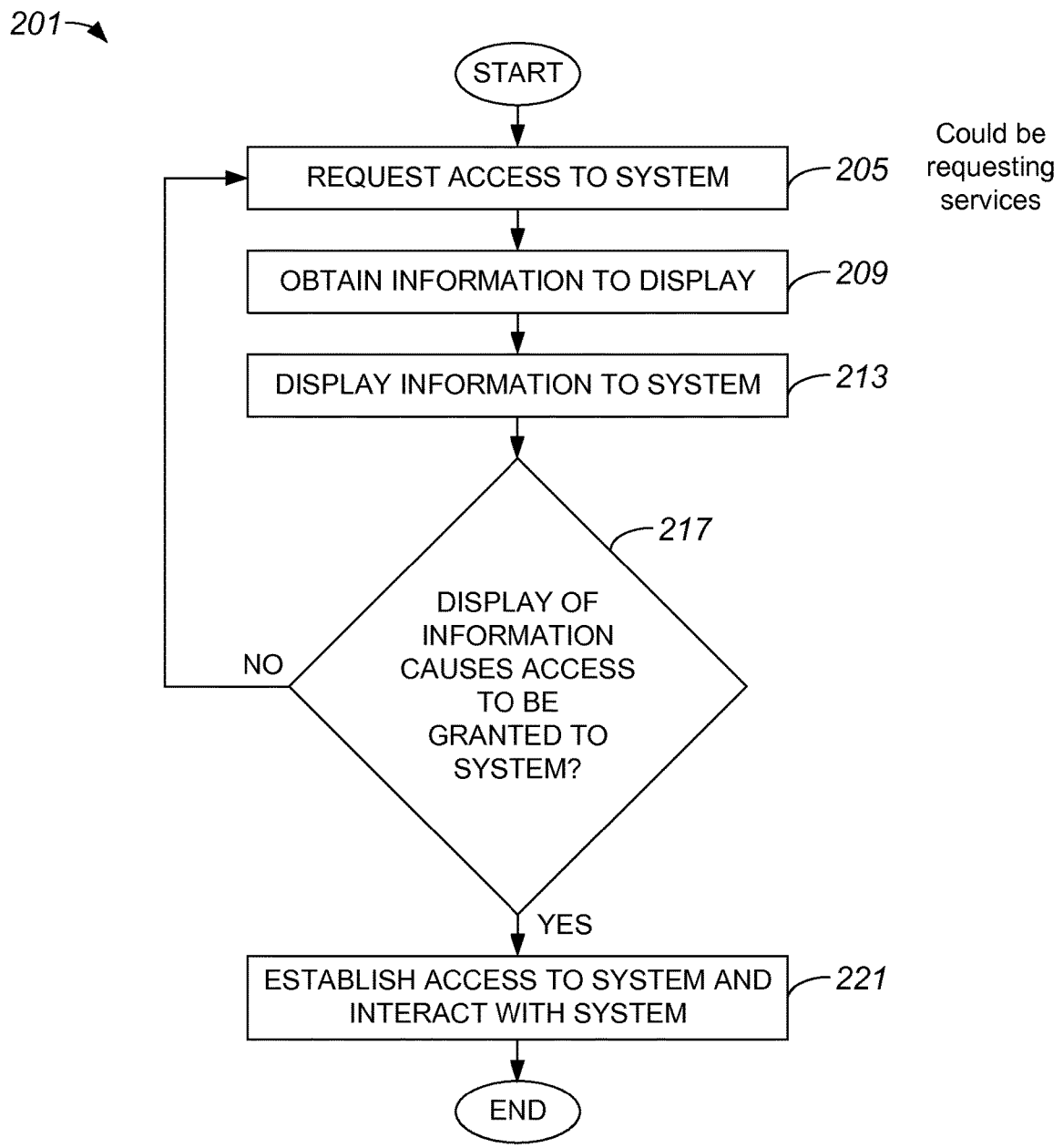
FIG. 2 is a process flow diagram which illustrates a method of accessing a system through the use of visual recognition in accordance with an embodiment.

With reference to FIG. 2, a method of accessing a system through the use of visual recognition will be described from the point-of-view of a device on which information is to be displayed in accordance with an embodiment. A method 201 of accessing a system begins at step 205 in which a user requests access to a system, e.g., an application server system. When a user requests access to a system, the user generally requests access to services such as applications on the system or services accessible through the system, and/or access to resources on the system or resources accessible through the system. Such a request for access is typically a request to register, and may be made using a device or computing system in the possession of the user. In one embodiment, the request for access to a system may be a request to register a device with a router.

Once the user requests access to the system, the user may obtain information to display on a display screen of a device, e.g., the device used to make the request to access the system, in step 209. In one embodiment, the information to display may be a visual message indication, e.g., a security code or a text string, obtained from the system, as for example in response to the request for access to the system. In another embodiment, the information to display may be obtained from the device itself, e.g., by accessing a particular screen such as a home screen to display.

After the information to be displayed on a display screen is obtained, the information is displayed to the system in step 213. Displaying the information to the system may include capturing an image of the display screen using an image capture arrangement, e.g., a camera associated with a computing device, configured to capture the image of the display screen and to provide the captured image to the system. The captured image may be provided to the system using any suitable method including, but not limited to including, transmitting the captured image across a network.

A determination is made in step 217 as to whether the information displayed to the system causes access to be granted to the system. In other words, it is determined in step 217 whether the device is displaying information that identifies the device as suitable for accessing the system. Access may be granted if the displayed information causes the device to be substantially recognized by the system. In one embodiment, access may be granted when the system uses visual recognition to identify the information displayed to the system as being associated with the device and/or a particular user.

If it is determined that access is not to be granted for the device to access the system, the process flow returns to step 205 in which access to the system is once again requested. Alternatively, if it is determined that access is to be granted for the device to access the system, access to the system is established in step 221, and the user may interact with the system using the device. Establishing access to the system may include, but is not limited to including, substantially automatically registering the device with the system. The method of accessing the system is completed upon access to the system being established.

Figure 3:
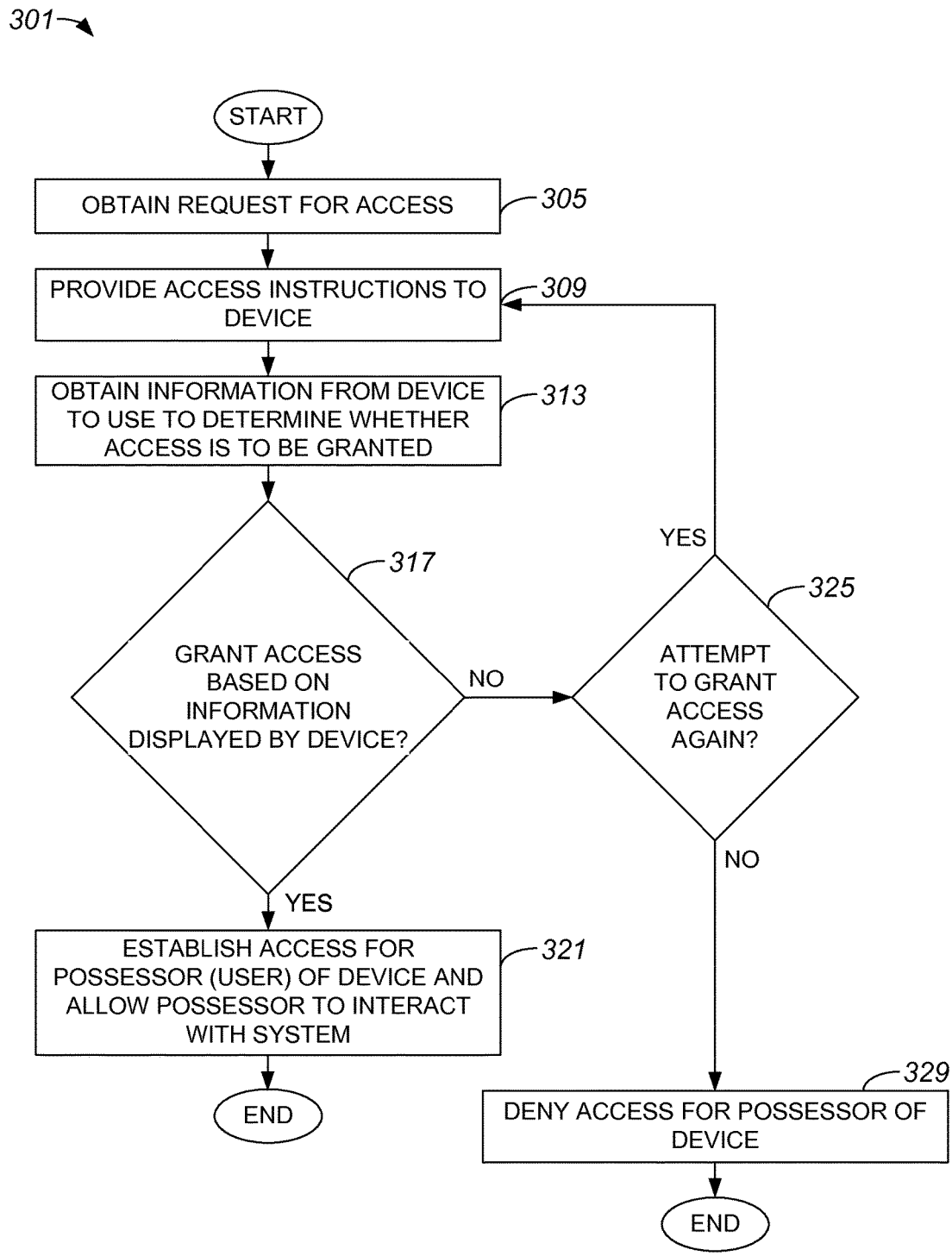
FIG. 3 is a process flow diagram which illustrates a method of granting access to a system through the use of visual recognition in accordance with an embodiment.

FIG. 3 is a process flow diagram which illustrates a method of granting access to a system, e.g., a server system, through the use of visual recognition in accordance with an embodiment. A method 301 of granting access to a system, from the point-of-view of the system, begins at step 305 in which a request for access to the system, e.g., a request to register with the system, is obtained. Such a request may be obtained by the system from a user or a possessor of a device, as for example through the device or through a computing system that is accessible to the user. It should be understood that a request for access to a system may generally be a request for access to services and/or resources that are accessible through the system.

In step 309, access instructions are provided to the device. Access instructions may be arranged to inform a user or possessor of the device what he or she should display on a display screen of the device in an effort to gain access to the system. For example, access instructions may indicate that a home screen of the device is to be displayed on the display screen. In one embodiment, the system may provide access instructions that include a security code that is to be displayed on the display screen, or may cause a text message to be sent to the device that includes a string that is to be displayed on the display screen.

After access instructions are provided to the device, information is obtained from the device in step 313 that may be used to determine whether access is to be granted. Such information may be obtained using an image capture arrangement, e.g., a camera, of an intermediate device that is in the vicinity of the device. Determining whether access is to be granted may include, but is not limited to including, determining whether the information obtained using the image capture arrangement is consistent with information known to be associated with the device.

From step 313, process flow moves to step 317 in which a determination is made as to whether to grant access to the user or possessor of the device. One method of making such a determination will be described below with reference to FIG. 4. If it is determined in step 317 that access is to be granted to the user or possessor of the device, access is established for the user or the possessor of the device in step 321, and the user or the possessor of the device is allowed to interact with the system as appropriate. In one embodiment, the device may be substantially automatically registered with the system such that the user or possessor may utilize services and/or resources associated with the system. That is, once the device is granted access, the device may substantially automatically be registered to use system services and/or resources without a need for the user or possessor to provide a device identifier or a token. The system may access data, e.g., information that identifies an address of the device, stored in a data store or repository after the device is visually identified, and then use the data to register the device with the system such that the user or possessor may access the system using the device. Once access to the system is established for the user or possessor, the method of granting access to the system is completed.

Alternatively, if the determination in step 317 is that access to the system is not to be granted to the user or possessor of the device, then process flow proceeds to step 325 in which it is determined whether to attempt to grant access again. In other words, it is determined whether the user or possessor of the device still wishes to access the system. The user or possessor of the device may indicate a desire to once again attempt to gain access.

If it is determined in step 325 that another attempt is to be made to grant access, process flow returns to step 309 in which access instructions are provided to the device. Alternatively, if it is determined in step 325 that no other attempt is to be made to grant access, then access for the user or possessor of the device is denied in step 329, and the method of granting access to the system is terminated.

Figure 4:
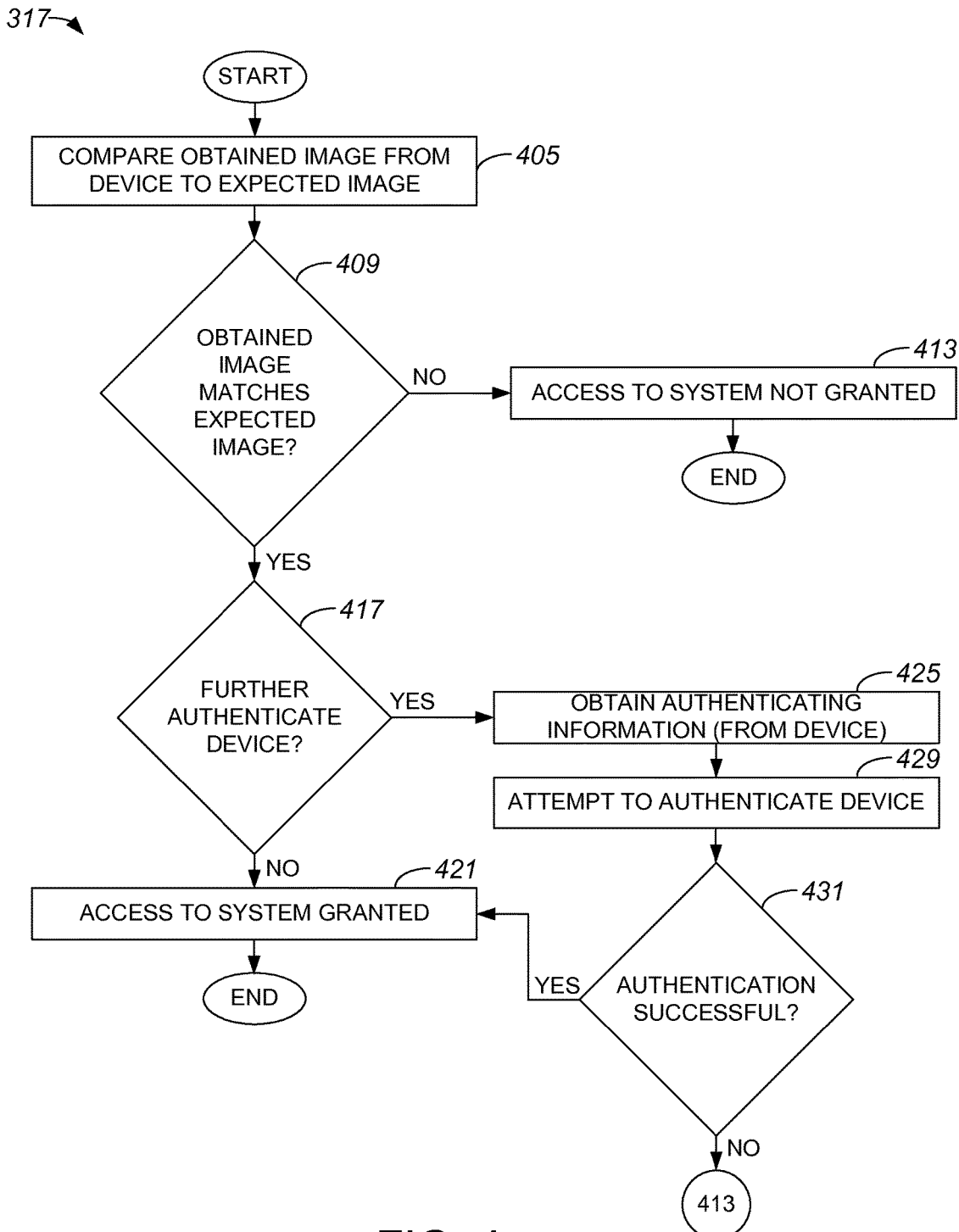
FIG. 4 is a process flow diagram which illustrates a method of granting access to a system through the use of visual recognition and additional authentication, e.g., step 317 of FIG. 3, in accordance with an embodiment.

With reference to FIG. 4, a method of granting access to a system through the use of visual recognition and additional authentication, e.g., step 317 of FIG. 3, will be described in accordance with an embodiment. A process 317 of granting access to a system, e.g., a server system, begins at step 405 in which an obtained image is compared to an expected image. The system may process an image of a screen of a user device obtained by an intermediate system, e.g., a computing system in the vicinity of the user device, and compare the image of the screen to an expected image, e.g., information associated with an expected image that is stored by the system. For example, the image of a screen of a user device may show a particular background, and the information associated with the expected image may identify the particular background.

After an obtained image is compared to an expected image, a determination is made in step 409 as to whether the obtained image effectively matches the expected image. If the determination is that the obtained image does not effectively match the expected image, then access to the system is not granted in step 413, and the process of granting access to the system is terminated.

Alternatively, if the determination in step 409 is that the obtained image effectively matches the expected image, then a determination is made in step 417 as to whether further authentication may be needed to authenticate the device. As will be appreciated by those skilled in the art, in some instances, a device may fall into the wrong hands. To prevent illicit use of a device, e.g., illicit use of a device that enables a wrongful or unauthorized holder of the device to gain access to a server system, additional authentication may be used. For example, in addition to processing an image of a display screen of a device, further authentication may be used to effectively ensure that a user in possession of the device is a rightful user or owner of the device. It should be appreciated that, in some embodiments, the device is not further authenticated after it is determined that the obtained image effectively matches the expected image, and access to the system may be granted upon determining that the obtained image effectively matches the expected image.

In the described embodiment, if the determination in step 417 is that further authentication is not needed, access to the system is granted in step 421, and the process of granting access to the system is completed. Alternatively, if it is determined in step 417 that the device is to be further authenticated, authenticating information is obtained, e.g., from the device, in step 425. Authenticating information may include, but is not limited to including, an image of a current user of the device obtained by an intermediate system and/or an image of a code entered onto the device by the user. An attempt is made to authenticate the device in step 429. Authenticating the device may include comparing the authenticating information obtained in step 425 with information stored by, or otherwise accessible to, the system.

A determination is made in step 431 as to whether the authentication was successful. If the determination is that the authentication was not successful, process flow returns to step 413 in which access to the system is not granted. Alternatively, if it is determined that the authentication was successful, access to the system is granted in step 421.

Figure 5:
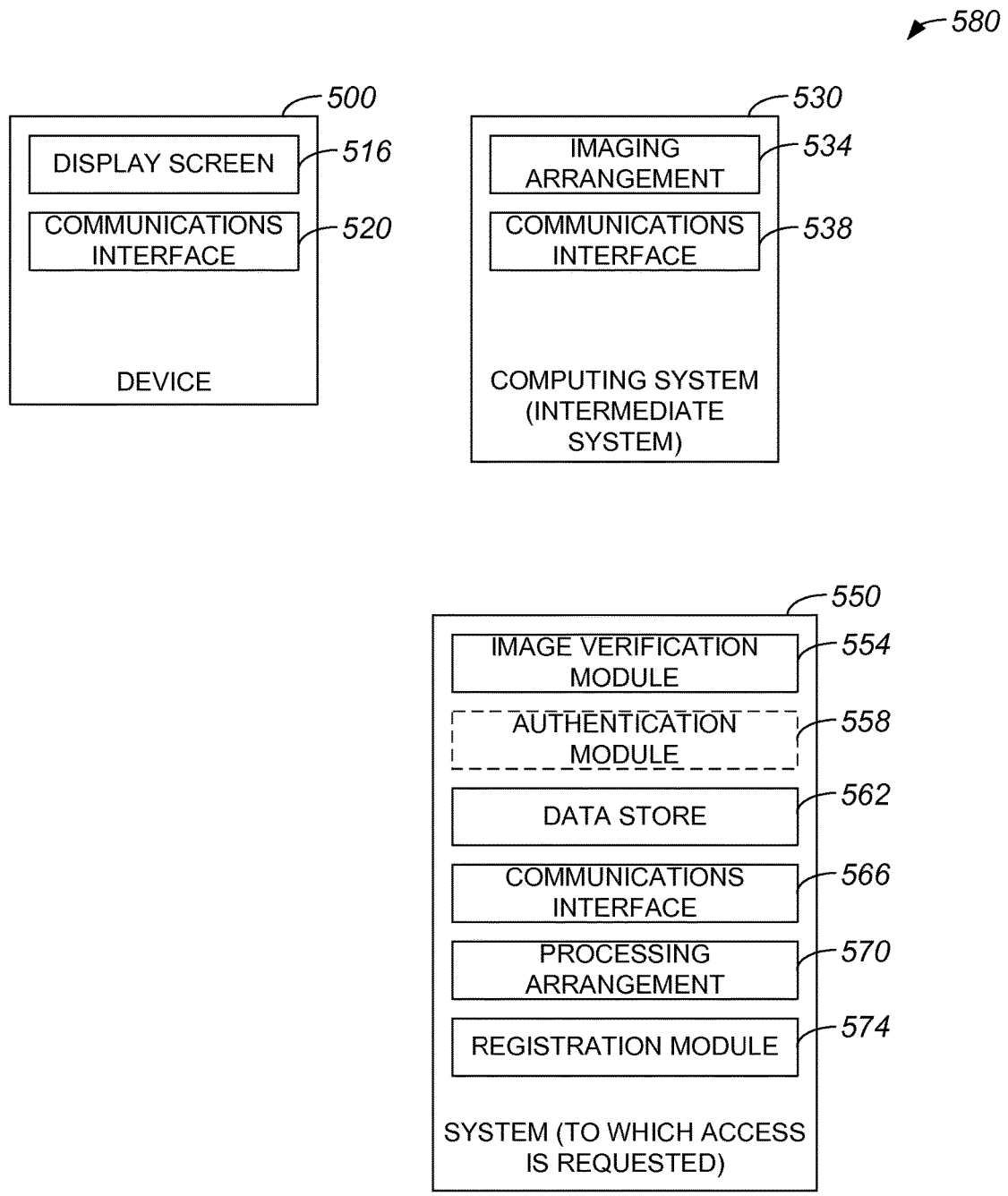
FIG. 5 is a block diagram representation of an overall network in which visual recognition may be used to grant access to a system within the network in accordance with an embodiment.

In general, a user device, an intermediate system, and a server system may be in communication within an overall network. Referring next to FIG. 5, of an overall network in which visual recognition may be used to grant user access to a system will be described in accordance with an embodiment. An overall network may include a device 500, e.g., a device that is in the possession of a user, a computing system 530, and a server system 550. Device 500 may generally be any device that includes a display screen 516. By way of example, device 500 may be, but is not limited to being, a mobile or cellular phone, a laptop computer, a tablet computer, a personal digital assistant, a digital media player, or an electronic gaming device. In addition to including a display screen 516 that is arranged to display information or content contained on device 500, device 500 also includes a communications interface 520 that enables device 500 to communicate within overall network 580. Communications interface 580 typically includes an input/output interface and/or a communications port.

Computing system 530, or an intermediate system, is arranged in the described embodiment to obtain an image of at least display screen 516 and to provide the image to server system 550. Computing system 530 includes an imaging arrangement 534 and a communications interface 538. Imaging arrangement 534 may be any interface that is arranged to effectively capture an image. In one embodiment, imaging arrangement 534 may be a camera that is arranged to capture still and/or moving images. Communications interface 538 generally includes an input/output interface and/or a communications port, and allows computing system 530 to communicate within overall network 580.

In the described embodiment, server system 550 is a server system which a user in possession of device 500 wishes to access. Access to server system 550 may be desired such that the user in possession of device 500 may utilize services provided by server system 550, or such that the user in possession of device 500 may otherwise access resources of server system 550. Although access to server system 550 is generally requested by the user in possession of device 500 such that device 500 may access server system 550, it should be appreciated that access to server system 550 may instead be requested by the user in possession of device 500 such that computing system 530 may access server system 550. Server system 550 is generally aware that device 500 may request access to server system 550, and that any image of display screen 516 may be captured by intermediate system 530 and provided to server system 550 in response to, or as a part of, the request for access.

In one embodiment, at the time of a request for access, intermediate system 530 may augment the request to server 550 using any suitable method. For example, if a request is an http request, an image of display screen 516 may be attached as a URI encoded in a header of the request or as another indicator that allows server 550 to locate the image. Alternatively, intermediate system 530 may send a separate request to server 440 to store an image of display screen 516 into data store 562 with a time stamp such that server 550 may associated any request from device 500 by matching time stamps of the stored image.

An image verification module 554 is included in server system 550. Image verification module 554, which may be embodied as hardware and/or software logic embodied in a tangible medium, is generally arranged to process an image obtained by computing system 530 to determine whether a user in possession of device 500 is to be granted access to server system 550. In one embodiment, when a request for access is obtained through a communications interface 566 and provided to a registration module 574, registration module 574 may cause the image to be obtained. Image verification module 554 may generally execute a visual recognition algorithm that identifies content and features captured by imaging arrangement 534, and may ascertain whether the content and features are as expected and, therefore, effectively determine when access to server system 550 is to be granted to the user in possession of device 500. In one embodiment, image verification module 554 may generate an image or other information to be provided to device 500 for display on display screen 516 prior to an image of display screen 516 being captured by imaging arrangement 534.

An optional authentication module 558 may be included in server system 550. Authentication module 558 is arranged to cooperate with image verification module 554 to provide additional authentication relating to a user in possession of device 500 prior to granting access to server system 550. For example, authentication module 558 may be arranged to cooperate to determine if the user in possession of device 500 is the rightful owner of device 500, and not an individual who should not be in possession of device 500. In one embodiment, authentication module 558 may be arranged to process an image of a user in possession of device 500 using facial recognition software in an effort to verify that device 500 is in the possession of a rightful user.

Server system 550 also includes a data store 562, communications interface 566, and a processing arrangement 570. Data store 562 is configured to store data that may be used by image verification module 554 and optional authentication module 558 to determine whether access to server system 550 is to be granted. In one embodiment, data store 562 may store information associated with device 500 that may be used to effectively verify that device 500 is trustworthy, or may otherwise be granted access to server system 550. For example, data store 562 may store information that identifies an image that is expected to be displayed on device 500. Although data store 562 is shown as being included in server system 550, it should be appreciated that an external data store (not shown) may be used in lieu of data store 562, and may be remote with respect to server system 550 and accessible to other nodes within overall network 580. If an external data store (not shown) is remote with respect to server system 550, then server system 550 may include an interface (not shown) that allows server system 550 to access the external data store.

Communications interface 556 is configured to allow server system 550 to communicate within overall network 580, e.g., to obtain an image captured by computing system 530 and to allow device 500 to access content (not shown) associated with server system 550. Processing arrangement 570 is arranged to cooperate with image verification module 554 and optional authentication module 530 to determine whether to grant access to server system 550. Processing arrangement 570 is also arranged to cooperate with registration module 574 to register device 500 with server system 550, e.g., to grant access to device 500.

Figure 6:
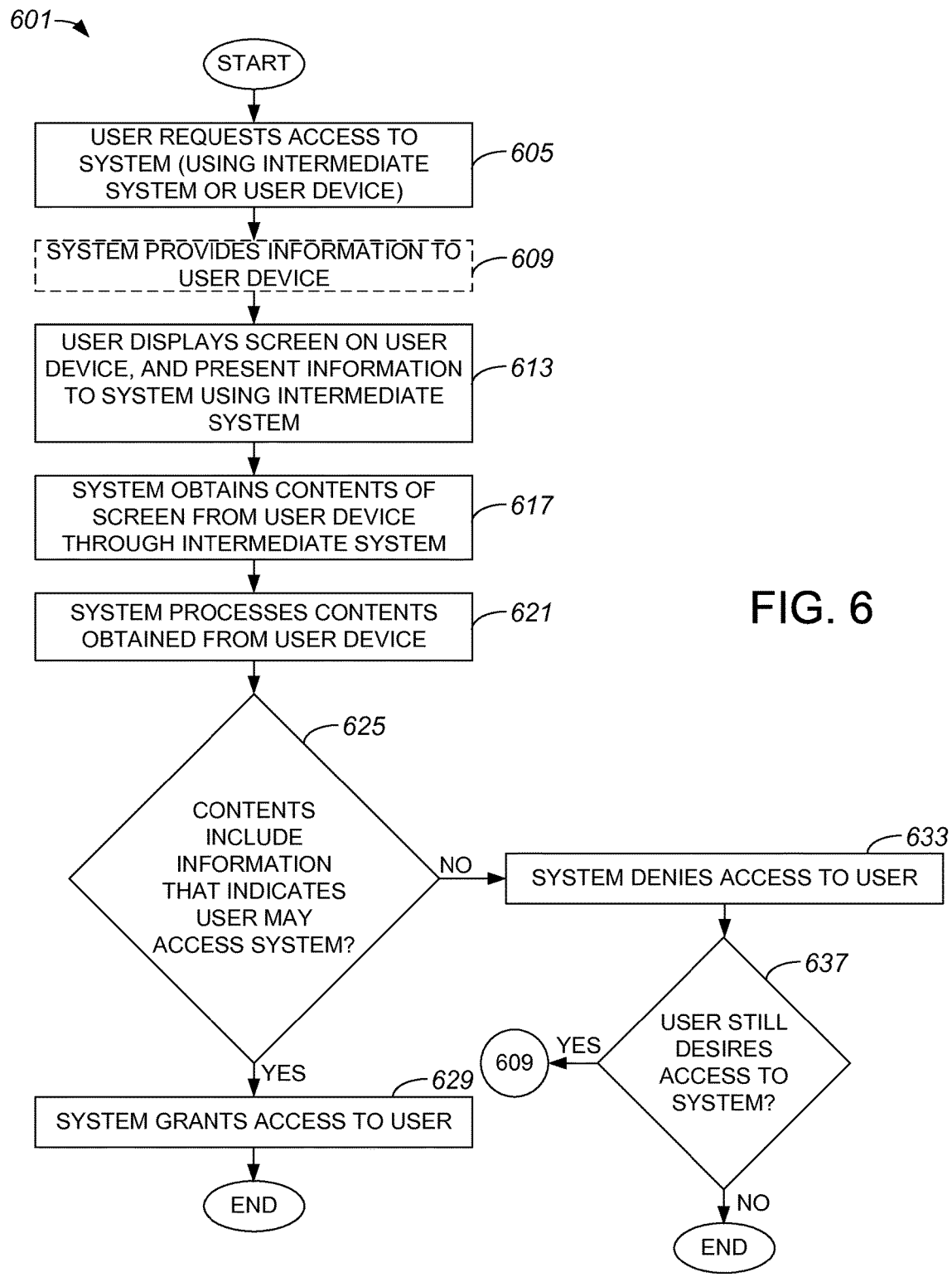
FIG. 6 is a process flow diagram which illustrates actions that occur within a network between a user and a system to which the user desires access in accordance with an embodiment.

In general, when a user requests access to a system such as a server system, the server system interacts with a device or system of the user to determine if access may be granted. FIG. 6 is a process flow diagram which illustrates actions that occur within a network between a user and a system to which the user desires access in accordance with an embodiment. A process 601 of interacting between a user and a system to which the user desires access begins at step 605 in which the user requests access to the system, e.g., a server system. The request for access may be a request to utilize a service provided by the system and/or accessible through the system, or the request for access may be a request to access resources associated with the system and/or accessible through the system. The user may request access using either an intermediate system, e.g., a computer system that the user has access to, or a user device, e.g., a mobile phone that the user has possession of.

After the user requests access to the system, the system may optionally provide information to the user device in step 609. In one embodiment, if information that may be visually recognized by the system is present on the user device, then the system may not need to provide information to the user device. For example, if a user device includes a screen that may be recognized by the system as being associated with the user, then the system may elect not to provide information to the user device in step 609.

In step 613, the user displays a screen on the user device, and presents information displayed on the screen to the system using the intermediate system. By way of example, as discussed above, the user may hold the screen of the user device up to a camera of the intermediate system such that the camera may effectively capture an image of the screen or, more generally, contents of the screen. Once the information on the screen of the user device is effectively captured using the intermediate system, the system may essentially obtain the contents of the screen of the user device through the intermediate system in step 617. Upon obtaining the contents of the screen, the system processes the contents in step 621. Processing the contents of the screen may include, but is not limited to including, utilizing visual recognition algorithms to identify the contents.

A determination is made in step 625 as to whether the contents of the screen include information, e.g., information provided to the user device in step 609, that indicates that the user may be granted access to the system. That, it is determined in step 625 whether the contents of the screen are such that the user device is effectively identifiable as being associated with a party who may be authorized to access the system. If the determination is that the user may access the system, then in step 629, the system grants access to the user. It should be appreciated that, in some embodiments, additional authentication may be performed prior to the system granting access to the user. For example, an image of the user may be obtained when the display screen on the user device is captured by the intermediate system, and a facial recognition algorithm may be used to identify the user in addition to determining if the contents include information that indicates that the user may access the system. After the system grants access to the user in step 629, the user may access the system through either the user device or the intermediate system, and the process of interacting between a user and a system is completed.

Alternatively, if the determination in step 625 is that the contents do not include information that indicates that the user may access the system, the system denies access to the user in step 633. Process flow then proceeds to step 637 in which a determination is made as to whether the user still desires access to the system. If the determination is that the user does not still desire access to the system, the process of interacting between a user and a system is terminated. If, however, the determination is that the user still desires access to the system, process flow returns to optional step 609 in which the system may provide information to the user device.

Although only a few embodiments have been described in this disclosure, it should be understood that the disclosure may be embodied in many other specific forms without departing from the spirit or the scope of the present disclosure. By way of example, while a server system to which a user requests access has been described as implementing a visual recognition algorithm to process a visual image of a display screen of a device of the user, a visual recognition algorithm may instead be implemented by an intermediate device that obtains the visual image of the display screen. In other words, an intermediate device may obtain a visual image of a display screen of a user device, process the visual image using a visual recognition algorithm, and provide the results of the processing to a server system.

Authenticated unique content that is provided by a system to a device that is to register with the system using visual recognition may include character strings provided via a text message in response to a request to register, as discussed above. It should be appreciated that authenticated content is not limited to being provided in a text message, and also is not limited to being a character string. For example, authenticated content may be provided in an email message, and may take the form of any suitable code such as a QR code that has a time element.

A visual recognition system associated with an application server system may effectively be used by different services to effectively provide associations. For instance, a set of devices may be sequentially displayed to a visual recognition system such that a group may be defined to include the set of devices. Within such a group, preferences collected by the visual recognition system from any one of the devices may be shared within the group. In one embodiment, a phone service may use a visual recognition system to efficiently define a group of phones which may share preferences.

In order for a server system to effectively recognize contents displayed on a display screen of a device in the possession of a user, the user may participate in a training process. The training process typically allows the server system to become aware of which contents the server should associate with the user. For example, a user may provide an image to the server system that shows what is displayed on his or her mobile phone home screen, and may identify the image as belonging to the user. Upon receiving such an image, the server system may store the image with an indication that the image is associated with the user. In one embodiment, a training process may involve the user providing information such as a serial number of the device, an address such as a MAC address or an IP address of the device, and/or other identifying information that identifies the device. Such information may be used, for example, to automatically register the device with and/or using the server system once access is granted to the server system based on an image of the display screen of the device.

Visual recognition may be used to detect visual information presented on a screen of a device, e.g., a mobile phone or a tablet computer, such that access to a system may be granted effectively to the device. That is, if access is granted through visual recognition, then the device may then access the system. Alternatively, if access to a system is desired by an intermediate device such as a computer system, visual recognition may still be used to detect visual information presented on the screen of a device such as a mobile phone or a tablet computer in order to determine if the intermediate device may be granted access. For example, when a user of a computer system wishes to access a server using the computer system, visual information on a mobile phone screen of the user may be presented to effectively determine if the user may be granted access to the server. If the visual information on the mobile phone screen of the user is recognized, then the user may use the computer system to access the server.

It should be appreciated that although visual recognition has generally been described as being associated with identifying or otherwise recognizing something displayed on a device, visual recognition may instead be associated with actions performed with respect to the device. By way of example, when access to a system is desired by a user, the system may cause a mobile phone in possession of the user to ring. Visual recognition may involve visually identifying that the mobile phone is ringing, and visually identifying that the user answers his or her ringing phone.

As previously mentioned, an image may be used to allow an individual to log into a system, e.g., an image may effectively serve as a password. Similar to a password, an initial image may be provided in an image library of a system for reference, or matching purposes. Newer images may be added to the image library. By way of example, an image of a person may be in an image library associated with the person, and an image of a device belonging to the person may be subsequently added to the image library associated with the person. Thus, an image of the person and/or an image of the device belonging to the person may both be used to effectively authenticate the person. The newer images maybe obtained in a variety of different ways. For instance, a new device belonging to a person may be identified as being associated with the person when an image is captured that includes both the person and the device.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure.

What is claimed is:

1. A method comprising:
    identifying a request for access to a first system;
    providing a second piece of information to a first device after identifying the request;
    obtaining a visual image, the visual image including at least a first piece of information associated with the request, wherein the visual image is associated with the first device and obtained using a second device;
    determining if the at least first piece of information indicates that the access to the first system is to be granted, wherein determining if the at least first piece of information indicates that the access to the first system is to be granted includes implementing a visual recognition algorithm to process the at least first piece of information and wherein determining if the at least first piece of information indicates that the access to the first system is to be granted further includes determining if the at least first piece of information includes the second piece of information, wherein the second piece of information includes at least one selected from a group including a text string and a security code; and
    granting the access to the first system if it is determined that the at least first piece of information indicates that the access to the first system is to be granted.

2. The method of claim 1 wherein the visual image is displayed on a display screen of the first device, and wherein the second piece of information is unique content arranged to identify the first device.

3. The method of claim 1 wherein granting the access to the first system includes granting access to the first system through the first device.

4. The method of claim 3 wherein granting the access to the first system through the first device includes allowing the first device to utilize one selected from a group including a service and a resource associated with the first system.

5. The method of claim 1 wherein the request for access to the first system is a request for a service provided by the first system.

6. One or more non-transitory media including computer executable instructions, when executed by a
    processor cause the processor, to:
    identify a request for access to a first system;
    provide a second piece of information to a first device after identifying the request;
    obtain a visual image, the visual image including at least a first piece of information associated with the request, wherein the visual image is associated with the first device and obtained using a second device;
    determine if the at least first piece of information indicates that the access to the first system is to be granted, wherein the computer executable instructions that cause the processor to determine if the at least first piece of information indicates that the access to the first system is to be granted is further operable to implement a visual recognition algorithm to process the at least first piece of information, and wherein the computer executable instructions that cause the processor to determine if the at least first piece of information indicates that the access to the first system is to be granted is still further arranged to determine if the at least first piece of information includes the second piece of information, wherein the second piece of information includes at least one selected from a group including a text string and a security code; and grant the access to the first system if it is determined that the at least first piece of information indicates that the access to the first system is to be granted.

7. The one or more non-transitory media of claim 6 wherein the visual image is displayed on a display screen of the first device, and wherein the second piece of information is unique content arranged to identify the first device.

8. The one or more non-transitory media of claim 6 wherein the computer executable instructions that cause the processor to grant the access to the first system is further operable to grant the access to the first system through the first device.

9. The one or more non-transitory media of claim 8 wherein the computer executable instructions that cause the processor to grant the access to the first system through the first device is further operable to allow the first device to utilize one selected from a group including a service and a resource associated with the first system.

10. The one or more non-transitory media of claim 6 wherein the request for access to the first system is a request for a service provided by the first system.

11. An apparatus comprising:
a registration hardware module, the registration hardware module being arranged to obtain a request to access the apparatus;
a communications interface including at least one selected from a group including an input/output interface and a communications port, the communications interface being arranged to enable the apparatus to obtain an image captured by a first system, the image including content of a screen, wherein the communications interface is arranged to obtain the image after the request to access the apparatus is obtained;
an image verification hardware module, the image verification hardware module being arranged to determine when the content of the screen is associated with a first device, the image verification hardware module further being arranged to identify the image as being of the first device when it is determined that the content of the screen is associated with the first device, wherein the registration hardware module is arranged to automatically register the first device when it is determined that the content of the screen is associated with the first device; and
a data store, the data store being arranged to store data associated with the first device, wherein the data associated with the first device includes an address of the first device and information associated with the screen associated with the first device.

12. The apparatus of claim 11 wherein the image verification hardware module is arranged to determine when the content of the screen is associated with the first device by comparing the information and the image.

13. The apparatus of claim 12 wherein the registration hardware module is arranged to obtain the address of the first device from the data store and to automatically register the first device when it is determined that the content of the screen is associated with the first device using the address of the first device obtained from the data store.

14. The apparatus of claim 11 further including:
a first resource, wherein the registration hardware module is arranged to automatically register the first device when it is determined that the content of the screen is associated with the first device by allowing the first device to access the first resource.

15. The apparatus of claim 11 further including:
a first service, wherein the registration hardware module is arranged to automatically register the first device when it is determined that the content of the screen is associated with the first device by allowing the first device to utilize the first service.

16. An apparatus comprising:
a registration hardware module, the registration hardware module being arranged to obtain a request to access the apparatus;
a communications interface including at least one selected from a group including an input/output interface and a communications port, the communications interface being arranged to enable the apparatus to obtain an image captured by a first system, the image including content of a screen, wherein the communications interface is arranged to obtain the image after the request to access the apparatus is obtained;
an image verification hardware module, the image verification hardware module being arranged to determine when the content of the screen is associated with a first device, the image verification hardware module further being arranged to identify the image as being of the first device when it is determined that the content of the screen is associated with the first device, wherein the registration module is arranged to automatically register the first device when it is determined that the content of the screen is associated with the first device, wherein the image verification hardware module is arranged to identify the image as being of the first device when it is determined that the content of the screen is associated with the first device by identifying that the content of the screen shows a home screen of the first device, and wherein the registration hardware module is arranged to automatically register the first device when it is determined that the content of the screen is associated with the first device by providing the first device with access to the apparatus.

* * * * *